United States Patent
Denton et al.

(10) Patent No.: US 6,421,438 B1
(45) Date of Patent: *Jul. 16, 2002

(54) INTELLIGENT SERVICES NETWORK ARCHITECTURE FOR GLOBAL CALLING CARD MOBILITY

(75) Inventors: Leonard Denton; Gary W. Leopold; Dennis Morton; Sharadha Vijay, all of Cedar Rapids, IA (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/148,597

(22) Filed: Sep. 4, 1998

(51) Int. Cl.[7] .................................................. H04M 3/42
(52) U.S. Cl. .............................. 379/207.12; 379/114.27; 379/219; 379/221.08
(58) Field of Search .......................... 379/93.02, 93.03, 379/115, 188, 189, 203, 207, 211, 219, 220, 221, 112, 196, 210, 114.15, 114.2, 114.27, 115.01, 115.03, 222, 223, 114.28

(56) References Cited

U.S. PATENT DOCUMENTS

| | | | | |
|---|---|---|---|---|
| 5,353,335 A | * | 10/1994 | D'Urso et al. | 379/88.05 |
| 5,561,706 A | * | 10/1996 | Fenner | 379/112 |
| 5,640,446 A | | 6/1997 | Everett et al. | |
| 5,966,431 A | * | 10/1999 | Reiman et al. | 379/115 |
| 6,188,761 B1 | * | 2/2001 | Dickerman et al. | 379/265.01 |

* cited by examiner

Primary Examiner—Ahmad F. Matar
Assistant Examiner—Bing Bui

(57) ABSTRACT

A distributed and scaleable Intelligent Service Network (ISN) architecture provides a global card mobility platform for enabling global card services. An ISN point of presence (POP) or node that comprises a scaleable matrix switching platform and voice call processing systems, is deployed to each country. These are referred to as Local Nodes. Extensive and generally expensive data and support systems are deployed in Regional Hubs, with multiple Local Nodes being connected to a single Regional Hub. This allows an inexpensive and minimized ISN node to be deployed in each country or shared by several countries. The other expensive components of a full-scale ISN are deployed and maintained by a large central company, and are shared by the multiple ISN Local Nodes in the region.

8 Claims, 7 Drawing Sheets

INTELLIGENT SERVICES NETWORK ARCHITECTURE FOR GLOBAL CALLING CARD MOBILITY

RELATED APPLICATIONS

The following applications are related to the present application, and are incorporated herein by reference in their entireties.

"System and Method for Detecting and Managing Fraud," Ser. No. 08/928,851, filed Sep. 12, 1997.

"Intelligent Services Network Using a Switch Controller," Ser. No. 09/096,036 filed Jun. 12, 1998.

"Switch Controller for a Telecommunications Network," Ser. No. 09/096,938 filed Jun. 12, 1998.

"Switch Controller Application Programmer Interface," Ser. No. 09/096,937 filed Jun. 12, 1998.

"A System and Method for Switch Controller Resource Management," Ser. No. 09/096,939, filed Jun. 12, 1998.

BACKGROUND OF THE INVENTION

1. Field of the Invention

The present invention is directed to calling card services, and preferably global calling card services.

2. Related Art

To take advantage of global market opportunities, many telecommunications companies are forming global alliances and joint ventures with other telecommunications companies. This allows a U.S. company, for example, to immediately gain a presence in a foreign market place, without having to take on the risks, costs, and delays of merger and acquisition activities. Through joint ventures with global alliances, a telecommunications company can market its products and services in other countries. While many different types of communications services are being offered through such joint ventures, an exemplary service is calling cards.

Calling card services are typically provided by a physical Intelligent Service Network (ISN) which uses an Automated Call Distributor (ACD) for a switching platform. Both ISNs and ACDs are well known in the art. Offering global card services introduces several unique requirements to the underlying ISN platform. For one, it should support customer roaming with the same "look and feel" for the service regardless of where the customer has roamed. For example, a customer from Germany should be able to place a card call from England or France using the same dialing plan and service features. It should also allow each joint venture company in each country to customize the service per their needs, and should provide each company with control over its service. For example, a joint venture company will typically want to provide its own product branding, which is implemented with customized audio recordings on a Voice Response Unit (VRU).

One conventional approach to meet the customization and control requirement for each joint venture company is to provide each with a full-scale ISN platform. However, a full-scale ISN platform is designed for high call volumes, and it is very expensive. Depending on the countries in which they are located, many joint venture companies will have low call volume requirements, and do not wish to invest in a large-scale ISN. Also, the practice of associating a full-scale ISN platform with each joint venture company does not fully support roaming requirements, since each joint venture company would be operating their own full-scale(service) platform independently. Interfaces and compatibilities of these different platforms would complicate the problem of meeting roaming requirements.

Another conventional approach is to deploy a single ISN platform at a central location, such as in the U.S., and transport every card call that requires ISN processing to this single ISN platform. However, this approach does not allow joint venture companies to own and operate their own ISN platforms, as many desire to do, and is also very expensive due to the network long-line and backhaul transport costs.

Another drawback with this second conventional approach is that it ties up numerous lines and switches when a roaming caller makes a call. This is because the call must be routed from the point of origin to the caller's home country for verification of the caller's identity, and from there, to the call destination. This is true even if the call is intended to remain in a single country. For example, if a U.S. caller places a call in the U.K. with an intended destination in the U.K., the call is transported to a Bridging Switch in the U.S. to be processed on a domestic (U.S.) ISN. The call is then transferred back to the U.K. (or wherever the call termination is) from the U.S. Bridging Switch. The U.S. Bridging Switch, along with trans-Atlantic trunks from the point of call origination and to the point of call termination, are in use for the entire duration of the call.

Thus, a system and method are needed to provide global card services (and other ISN-based telecommunications services) through joint ventures that will meet not only the control requirements of joint venture companies, but will provide desired services to the roaming customer and will also be scaleable so that small companies will be able to afford small-scale ISN platforms.

While the above has been described for illustrative purposes in terms of joint venture companies, countries, and calling card services, it should be understood that the invention described herein is not limited to this embodiment. Instead, the invention is directed to a system and method for distributed call services, as described below.

SUMMARY OF THE INVENTION

The present invention is directed to a telecommunications system and network to support call service mobility, such as global calling card mobility. The network includes at least one Regional Hub and at least one Local Node, although the typical case would be to have several local nodes for each regional hub.

The invention may also be used for any communications service that requires Intelligent Service Network (ISN) processing. These services include, but are not limited to, operator services, collect calling, prepaid card, integrated messaging, one number services like NICI Directline™, directory services, and any interactive voice response (IVR) service.

The present invention may also be used to provide global call center services, since the ISN architecture is virtually that of a call center. As a global call center solution, it may be packaged and offered to virtually any type of global business (not just telecommunications companies). These, and other, alternate embodiments would be apparent to one skilled in the art.

According to one exemplary embodiment of the invention, each regional hub is equipped with a full scale ISN, while local nodes are furnished with a scaleable ISN. The full scale ISN is described below and further described in a patent application entitled "Intelligent Services Network Using a Switch Controller," Ser. No. 09/096,936 filed Jun. 12, 1998, incorporated herein by reference in its entirety.

In another exemplary embodiment of the invention, the operators of the local nodes and the regional hubs are joint venture partners. It should be understood that the invention is not limited to this embodiment. The capability of each of the local nodes is determined by the requirements and desires of the local operator in the country in which the local node is deployed (and its government in many cases). If the country is small or has only a few customers using calling cards (e.g., Columbia), that local operator may desire to have a minimum capability ISN. On the other hand, if the country is a large industrialized nation with many calling card subscribers (e.g., Germany), that operator may desire to be equipped with an ISN (or multiple ISNs) closer to that of the full scale ISN of the regional hub.

The invention accommodates the requirements of not only the smaller operators but also the larger ones, by providing a system and method to handle long distance calling card calls made by both local customers and "roaming" customers.

According to another exemplary embodiment of the present invention, one local node is deployed for each joint venture country. Thus, in this embodiment, the terms "country" and "local node" have a one-for-one association. However, the invention is not limited to this embodiment. The scope of the invention is intended to cover embodiments where multiple local nodes are deployed in one or more countries, and/or when one or more local nodes are shared by a plurality of countries.

How a call is processed is a function of several factors. One factor is whether the caller is a local caller or a roaming caller. Another is the capability of the local node at which the call was placed. For example, if a caller is a roaming caller, the local node requests that the regional hub perform the validation. Also, if the roaming caller requests operator assistance, the local node passes this request to the regional hub. In both of these cases, the regional hub handles the request if possible, or passes the request to another node or hub if not. In addition, a local node may request that the regional hub process the validation and/or operator service request of a local caller if the local node is minimally equipped and does not have either or both of those capabilities. A key feature is distributed processing between the local node and the regional hub so that they can share functional resources.

Because of the distributed processing to share resources between a local node and a regional hub, the processing of the voice portion of a call may be kept in the country where the call originated. In an example where a U.S. caller places a call in the U.K., the local node in the U.K. requests the regional hub in the U.S. to validate the caller. This validation is via data messaging over dedicated lines, so trans-Atlantic trunks are not used. Once the regional hub in the U.S. validates the caller, the customer profile data is passed to the U.K. local node which processes the call. Trans-Atlantic trunks are not needed, as the "call" never leaves the U.K. This reduces network expense by eliminating the need for international long-line and backhaul transport.

Important features of the present invention include the design and use of small-scale ISN platforms with front-end voice call processing resources for local nodes, and the use of full-scale ISN platforms for regional hubs where each full scale ISN platform can support multiple local nodes. In addition, other important features are that the distributed architecture of local nodes and regional hubs enable mobility and roaming of customers throughout a region as a result of the processing between and among local nodes and regional hubs to validate a roaming caller's call and the processing between a local node and a regional hub to provide operator services for roaming callers and local callers. Additionally, the varying degrees of scaleability of a local node provides a joint venture company with the flexibility of being able to select varying degrees of functionality at corresponding degrees of cost.

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

The preferred embodiment of the invention is discussed with reference to the figures in which like reference numbers indicate like or similar elements. Furthermore, the left most digit of each reference number indicates the figure in which the reference number is first used. While specific part numbers, implementations, and configurations are discussed, it should be understood that this is done for illustration purposes only. A person skilled in the relevant arts will recognize that other components, implementations, and configurations may be used without departing from the spirit and scope of the invention.

Figure 1:
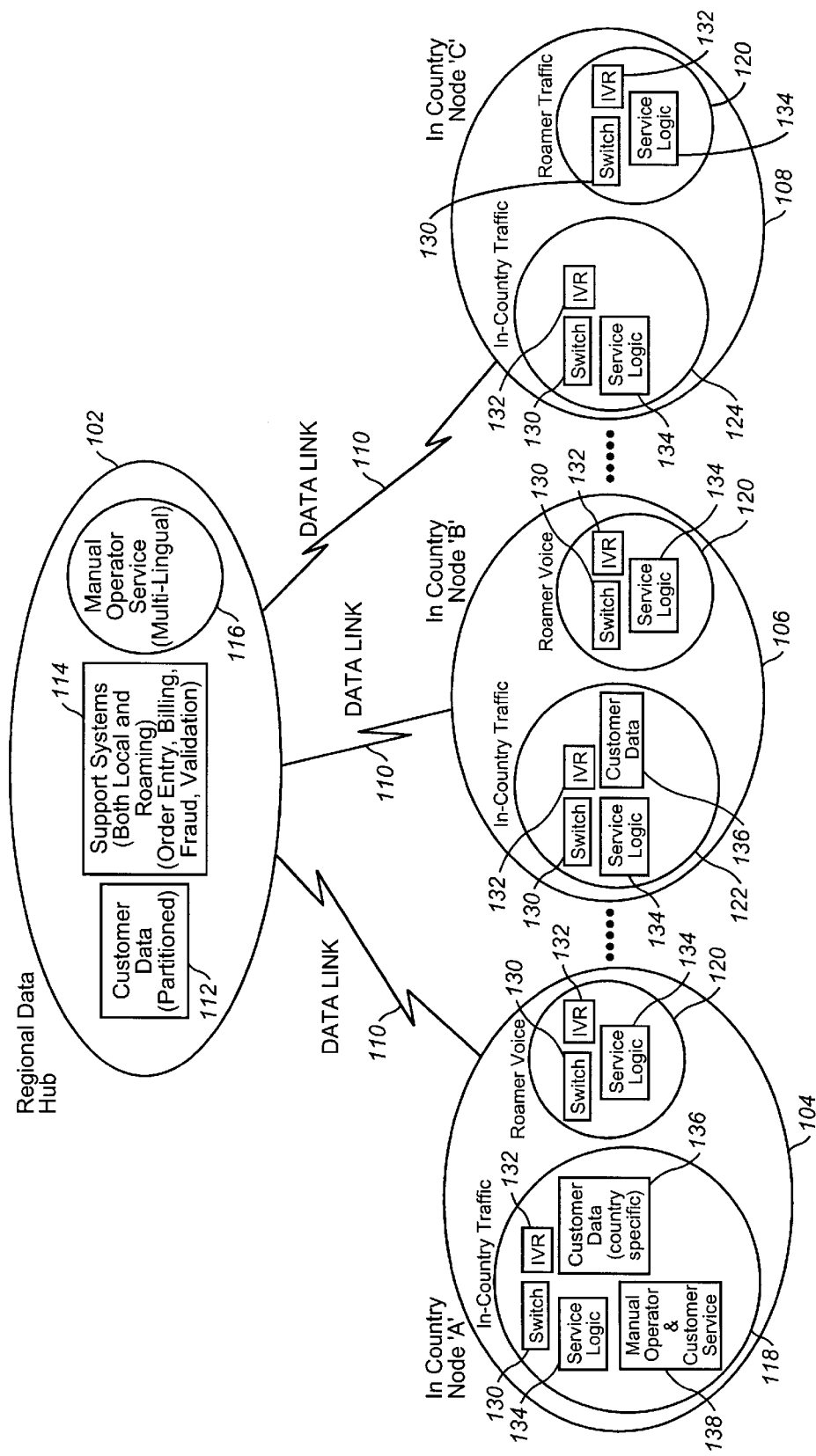
FIG. 1 illustrates a regional hub interconnected with three variations of local nodes.

A major element in providing long distance service is the Intelligent Service Network (ISN). Full scale ISNs shall now be described. FIG. 1 illustrates an example Regional Hub 102 which provides customer data services (including customer profiles) in a customer data module 112, support systems services (such as tariffs and rating, settlement and reconciliation, account validation, and order entry) in a support systems module 114, and manual operator services (both regional and multi-lingual) in a manual operator service capability module 116. A Local Area Network (LAN), such as an Ethernet LAN, typically interconnects the various computers that perform these functions. These services and functions are described in additional detail below.

A customer places a call using a Public Switched Telephone Network (PSTN) via standard voice trunks. The call is received at an ISN by an Automated Call Distributor (ACD) which is contained in the full scale ISN. Alternately the call may be received by a combination of a Programmable Switch and a Switch Controller which are contained in the full scale ISN. This combination is described in greater detail in related application entitled "Intelligent Services Network Using a Switch Controller," Ser. No. 09/096,936, filed Jun. 12, 1998, which is incorporated herein by reference in its entirety. The intercommunication between the Programmable Switch and the Switch Controller is typically via a LAN (as are other communications within the ISN), and uses data protocols such as User Datagram Protocol/Internet Protocol (UDP/IP) or Transmission Control Protocol/Internet Protocol (TCP/IP).

Other components in a full scale ISN may include a Network Audio Server (NAS) and an Automated Call Processor (ACP), which together constitute what is commonly known as a Voice Response Unit (VRU). Calls are received and processed by the NAS, which is a telephony-capable computer that plays audio messages for callers and accepts caller input by Dual Tone Multi-Frequency (DTMF) signals or speech recognition. The ACP performs the service logic and provides the NAS with instructions for service execution and audio messages to play. The ACP is a software program that can run on the same computer as the Switch Controller, though different computers may be used.

Each full scale ISN also may include an Operator Network Center (ONC) which is comprised of manual operator and customer service workstations operated by live operators. Calls are routed to a workstation by the Programmable Switch. Data for the call is provided by the Switch Controller via the LAN. Instructions for call processing are provided by the ACP via the LAN; some instructions may be contained within applications that run on the workstation. The ONC is typically supported by its own LAN, which is connected to the ISN Ethernet LAN via routers. This enables the ONC to be remotely located, if needed.

A full scale ISN may also include an Operations Center comprised of PC-based order entry workstations or terminals that embody various support systems. For example, one system is used for order entry of customer accounts and another is used for network management.

Customer profile data and service data are maintained by a Network Information Distribution Server (NIDS), which may also be in a full scale ISN. This data is used in various ISN call processing applications. As an example, a calling card call is validated against the customer profile stored in the NIDS.

Each NIDS is preferably connected to both an Ethernet LAN and a Token Ring LAN. The Token Ring LAN is part of the Data Distribution System (DDS).

The DDS is used to distribute order entry data, like customer accounts, to a plurality of NIDS. A type of order entry workstation is Commander, which handles customer accounts and billing information for global services, such as global calling card services addressed by the present invention. Data entered into Commander is collected by a DDS Server and can then be distributed among multiple NIDS.

A full scale ISN may also comprise a Rate Server, a Boot Server, and a Fraud Systems Server. The Rate Server is a mid-range computer or high performance PC that provides rates and rate quotes for the various services offered on the ISN platform. Any service application program, which typically executes on the ACP or a manual operator console, can call on the Rate Server for rate quotes for a service or feature. The Boot Server provides system startup configuration and initialization data to the various ISN systems. The Fraud System Server collects call records from the call processing elements, particularly the Programmable Switch, the Switch Controller, the ACP, and the Transaction Capabilities Application Port (TCAP) Gateway. It analyzes these records and detects possible instances of fraudulent use of call services. If such an instance is detected, it can launch any of a number of actions. For example, if a customer's calling card is stolen and being used fraudulently, the Fraud System detects this based on fraudulent calling patterns. It can then deactivate the card number. The "Sheriff" Fraud System is described in pending U.S. patent application entitled "System and Method for Detecting and Managing Fraud," Ser. No. 08/928,851, filed Sep. 12, 1997.

Additionally, Global Billing Systems capabilities may also be provided by a full-scale ISN. These systems collect various call and service records, correlate and enhance records, perform pricing and rating functions, and distribute billing records to invoicing systems. Global Billing Systems can be mid-range or mainframe based computers, and can either be physically located at the ISN or remotely located.

The components described above are generally well known. A full-scale ISN typically includes a plurality (sometimes most if not all) of the above-described components. The use of a Programmable Switch and a Switch Controller in lieu of the Automated Call Distributor is not generally well known. As indicated above, this configuration is described in a related application. The process of receiving, processing, validating, and completing a card call on a stand-alone ISN platform is generally well known.

The following definitions are used throughout this application:

Regional hub—a fully functional or full scale (or substantially fully functional/full-scale) ISN that typically is connected to one or more local nodes (regional hubs are typically full-scale, but they do not have to be, as, for example, some embodiments will not have voice processing);

Local node—a scalable (could be full-scale, but typically is less than full-scale) ISN;

Local caller—a caller who is a customer of the company that owns, operates, or otherwise services the local node at which the call originates;

Roaming caller—a caller who is a customer of a local node other than the one at which the call originates;

Home node—the node that is owned and/or operated by the company that services a caller (e.g., a local caller's home node is the local node, and a roaming caller's home node is a node other than the local node at which the call is placed).

Generally speaking, a regional hub is defined as having more functions than any local node. Similarly, a local node is defined as having less functions than any regional hub (though this is not necessary).

FIG. 1 is a block diagram of an exemplary architecture wherein there is an example regional hub 102 connected to three example local nodes 104, 106, and 108 via data links 110. Regional hub 102 is a fully functional ISN and includes a customer data module 112, a support systems module 114, and a manual operator service capability module 116. Support systems module 114 provides support as a rate server, a boot server, a validation server, a fraud systems server, an order entry workstation, a data distribution system, and a billing system. Manual operator module 116 preferably provides services in a number of languages in addition to the language in which regional hub 102 is located. However, this may not always be the case. In a preferred embodiment, customer data module 112 maintains customer profiles for customers from the country in which regional hub 102 is located as well as profiles from customers from all of the countries connected to regional hub 102 via data links 110.

Local node 104 is a "smaller scale" ISN, and is configured to provide calling card services to both local callers through the capabilities of in-country traffic module 118 and to roaming callers through the capabilities of roamer/voice module 120. In-country traffic module 118 is comprised of a switch module 130, an interactive voice response (IVR) module 132, a service logic module 134, a country specific customer data module 136, and a manual operator and customer service module 138. In-country traffic module 118 provides all calling card services to local callers, including voice call processing, customer service, validation, manual operator support, billing, and fraud avoidance. This is because in-country traffic module 118 has all the functional capabilities of a fully functional ISN with regards to local callers and includes a complete customer profile data base for all local customers within customer data module 136. Roamer/voice module 120, which supports roaming callers, is a minimally functional ISN and includes switch module 130, IVR module 132, and service logic module 134. It requests manual operator service and caller validation from regional hub 102 via link 110.

Local node 106 provides many services to local callers through the capabilities of in-country traffic module 122 and to roaming callers through the capabilities of roamer/voice module 120. What distinguishes in-country traffic module 122 of local node 106 from in-country traffic module 118 of local node 104 is that in local node 106, in-country traffic module 122 is made up of a switch module 130, an IVR module 132, a service logic module 134, and a country specific customer data module 136. In this configuration, roamer/voice module 120 provides voice call processing and customer support services such as validation and billing, but, because it is not equipped with a manual operator and customer service module, it does not provide manual operator service, which is provided by regional hub 102. In-country traffic module 122 of local node 106 is termed an intermediate capability ISN.

Local node 108 provides calling card services to local and roaming callers using the capabilities of in-country traffic module 124 and roamer/voice module 120. In local node 108, in-country traffic module 124 is termed a minimal capability ISN and is configured with a switch module 130, an IVR module 132, and a service logic module 134. Because in-country traffic module 124 is not configured with a manual operator and customer service module nor with a customer data module, it provides neither manual operator service nor customer support service to the local caller. These services are provided to the local caller from regional hub 102 via link 110. It can be noted that in local node 108, roamer/voice module 120 (for roaming callers) is the same capability as in-country traffic module 124 (for local callers). Local node 108 is envisioned as being used in smaller nations where the total volume of local calls does not presently support additional capability.

The minimum architecture of a Local Node is a switching platform and an IVR module. An IVR module is a VCU. One embodiment of a VRU is a NAS coupled to an ACP, though, in the minimal Local Node architecture, this ACP does not contain service logic. It only contains logic needed for NAS to play voice prompts and collect caller input.

Figure 2:
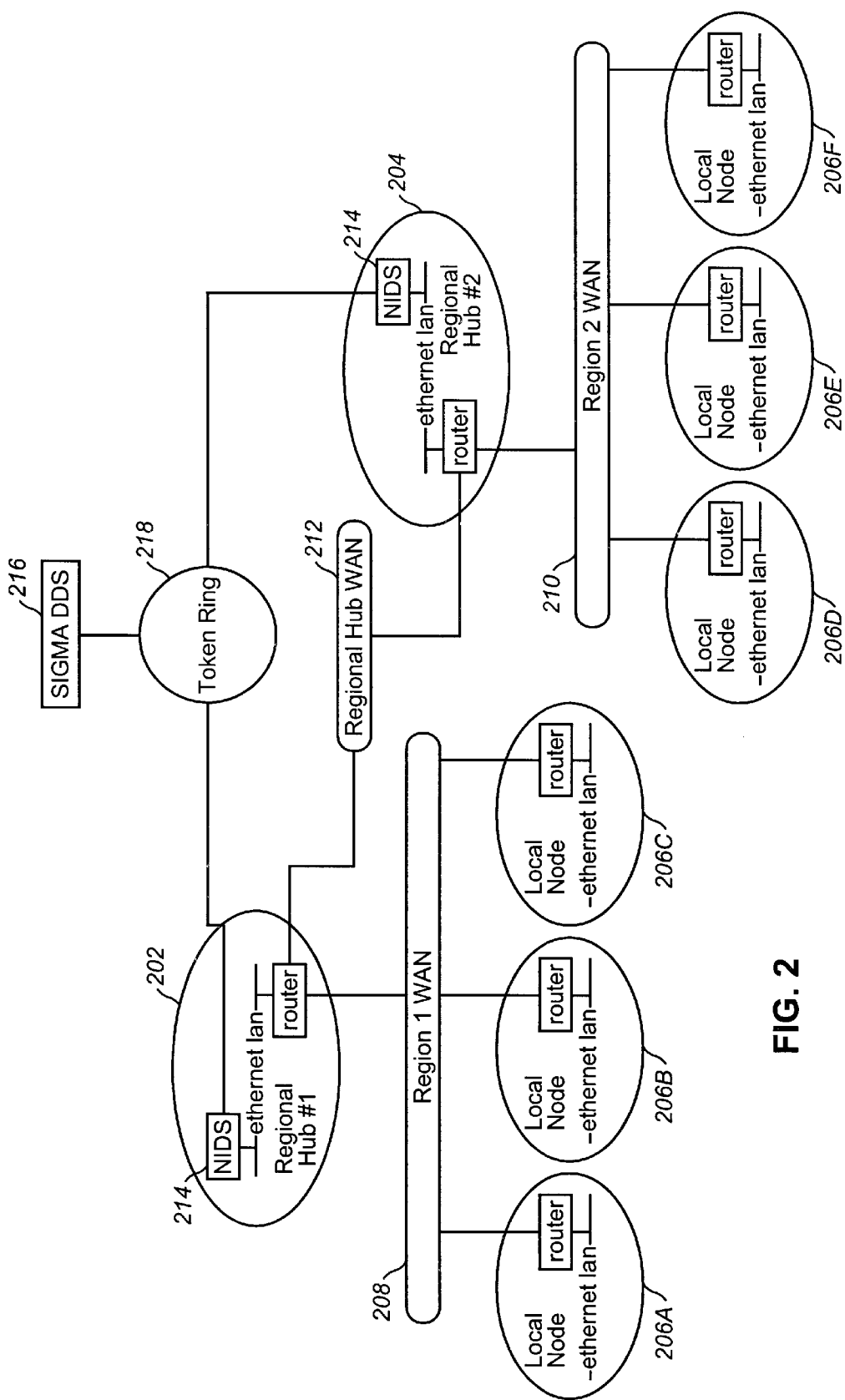
FIG. 2 illustrates two regional hubs connected together through the use of a Regional Hub Wide Area Network (WAN)

FIG. 2 is a block diagram showing the architectural interrelationships between and among a plurality of regional hubs and a plurality of local nodes. In FIG. 2, regional hub #1 202 is shown being connected to local nodes 206A–206C through region 1 wide area network (WAN) 208. Regional hub #2 204 is shown being connected to local nodes 206D–206F through region 2 WAN 210. It should be noted that regional hubs 202 and 204 are each similar to regional hub 102 as shown in FIG. 1. It should also be noted that local nodes 206 are each similar to local nodes 104, 106, and 108 of FIG. 1, but are shown here as a generic local node (i.e., since it is immaterial as to whether the local nodes in this depiction of the architecture are populated with full, intermediate, or minimum capability ISNs). Regional hub 202 and regional hub 204 are connected to each other through a regional hub WAN 212. While this figure shows three separate WANs 208, 210, 212, it would be obvious to one skilled in the art that this connectivity may also be achieved by a single WAN. FIG. 2 also shows NIDS 214 of regional hubs 202 and 204 connected to a SIGMA server supporting a DDS 216 through a token ring WAN 218. In the preferred embodiment shown in FIG. 2, local nodes 206 do not connect to WAN 218. This is because they have a local data server (LDS) in which they maintain their own customers' data and do not have any need for the data for customers from other nodes since these other customers are designated as roaming callers, and if validation is required, these roaming callers are processed by regional hub 202 or 204.

Figure 3A:
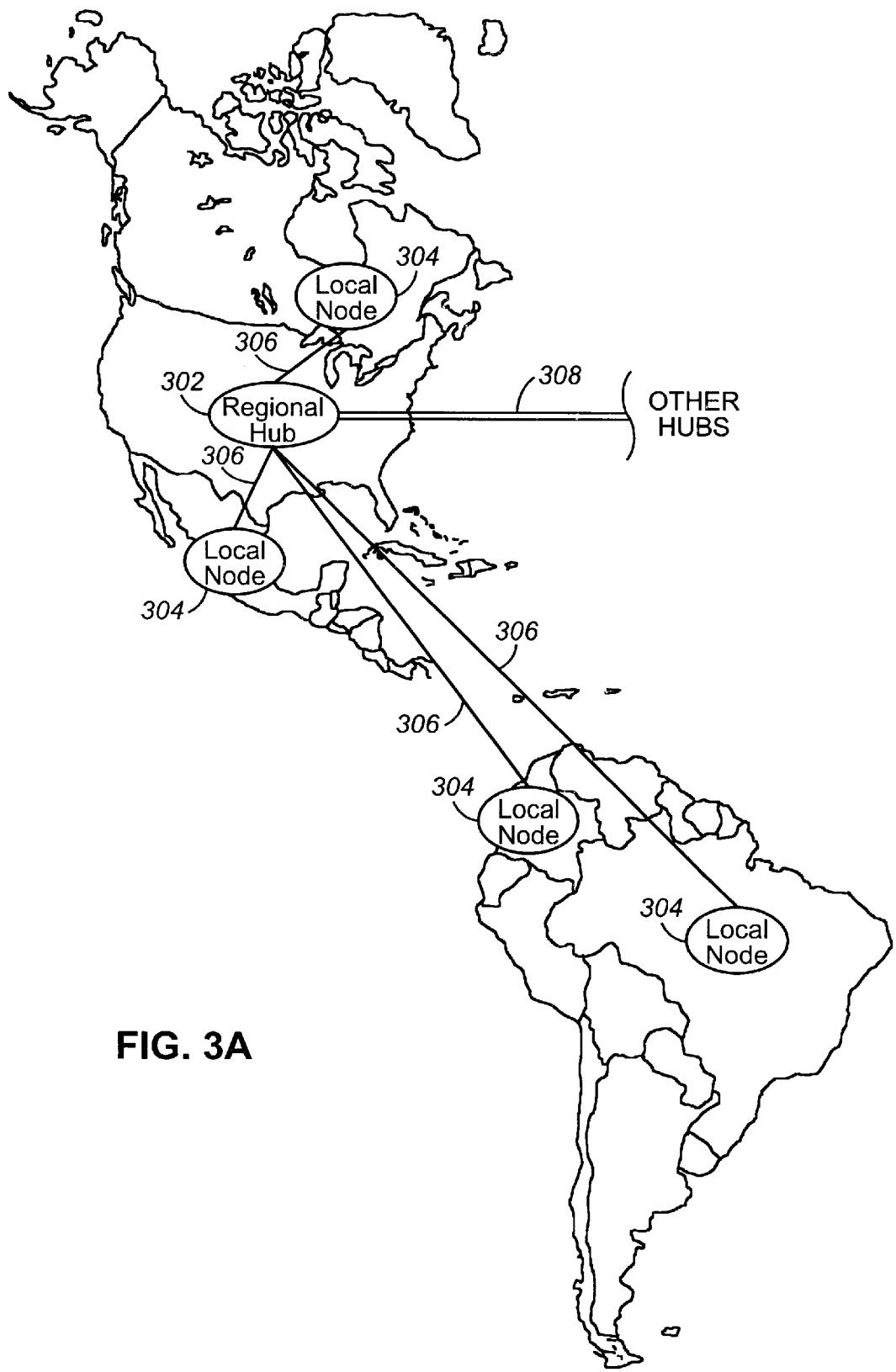
FIGS. 3A and 3B illustrate how the present invention might be deployed in America and Europe, where interconnections between hubs are indicated.

FIG. 3A shows an example of a regional hub/local node configuration in the Americas. In this deployment, the regional hub 302 in the U.S. serves as both a regional hub for the hemisphere, and also as the local node for the U.S. Other local nodes 304 are shown in a number of representative countries in the hemisphere. Local nodes 304 are connected to regional hub 302 via links 306, which are analogous to WAN 208 of FIG. 2. Regional hub 302 is connected to the regional hub 310 in the U.K. via link 308, which is analogous to WAN 212 and WAN 218 of FIG. 2.

Figure 3B:
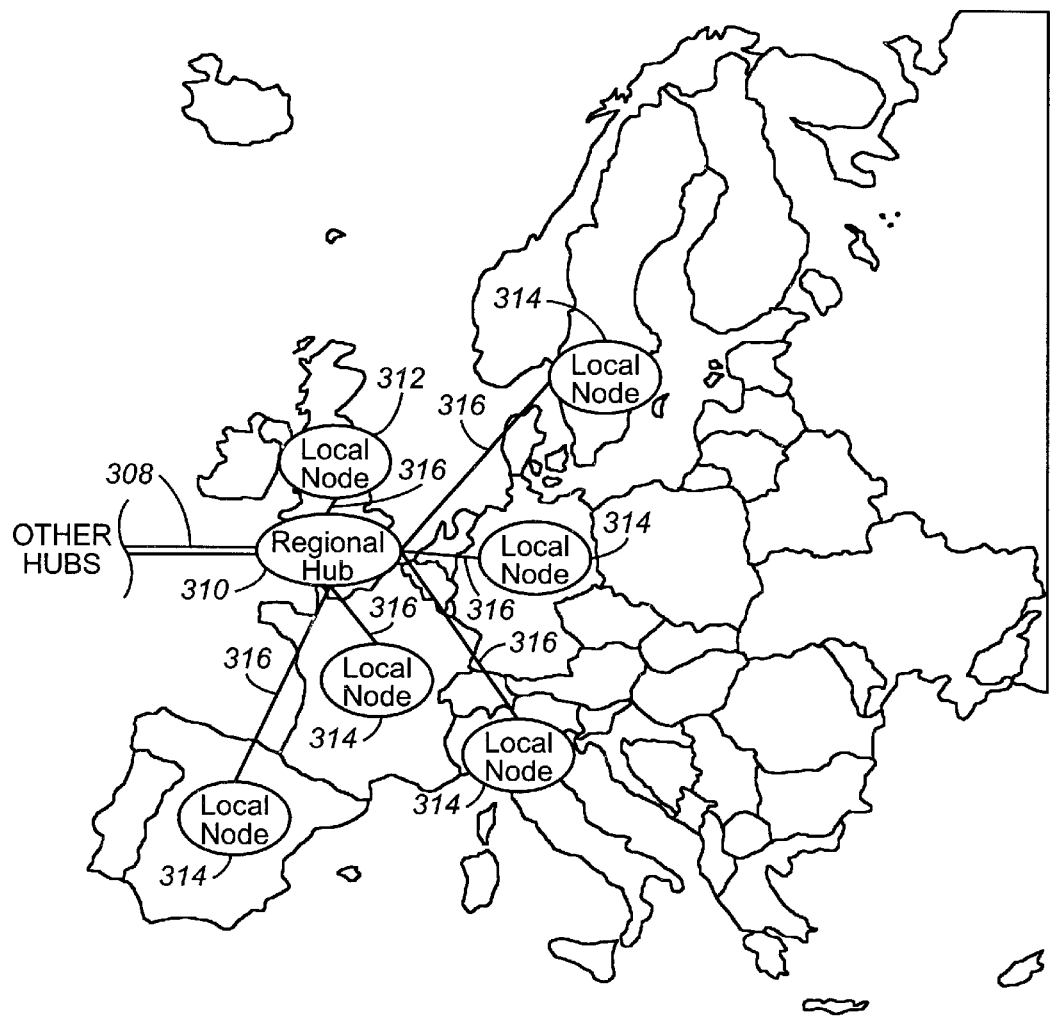

Looking now at the example regional hub/local node deployment of FIG. 3B, in Europe, regional hub 310 supports a local node 312 also in the U.K., as well as a plurality of local nodes 314 located throughout the continent. Local nodes 314 are connected to regional hub 310 via links 316. Links 316 are analogous to WAN 210 of FIG. 2.

It should also be noted that regional hubs 302 and 310 are analogous to regional hub 102 of FIG. 1 and to regional hubs 202 and 204 of FIG. 2, and that local nodes 304 and 314 are analogous to local nodes 104, 106, and 108 of FIG. 1 and to local nodes 206 of FIG. 2.

These deployments are for illustrative purposes only, and a person skilled in the art would recognize that any regional hub/local node deployment may be used without departing from the spirit and scope of the invention.

Figure 4A:
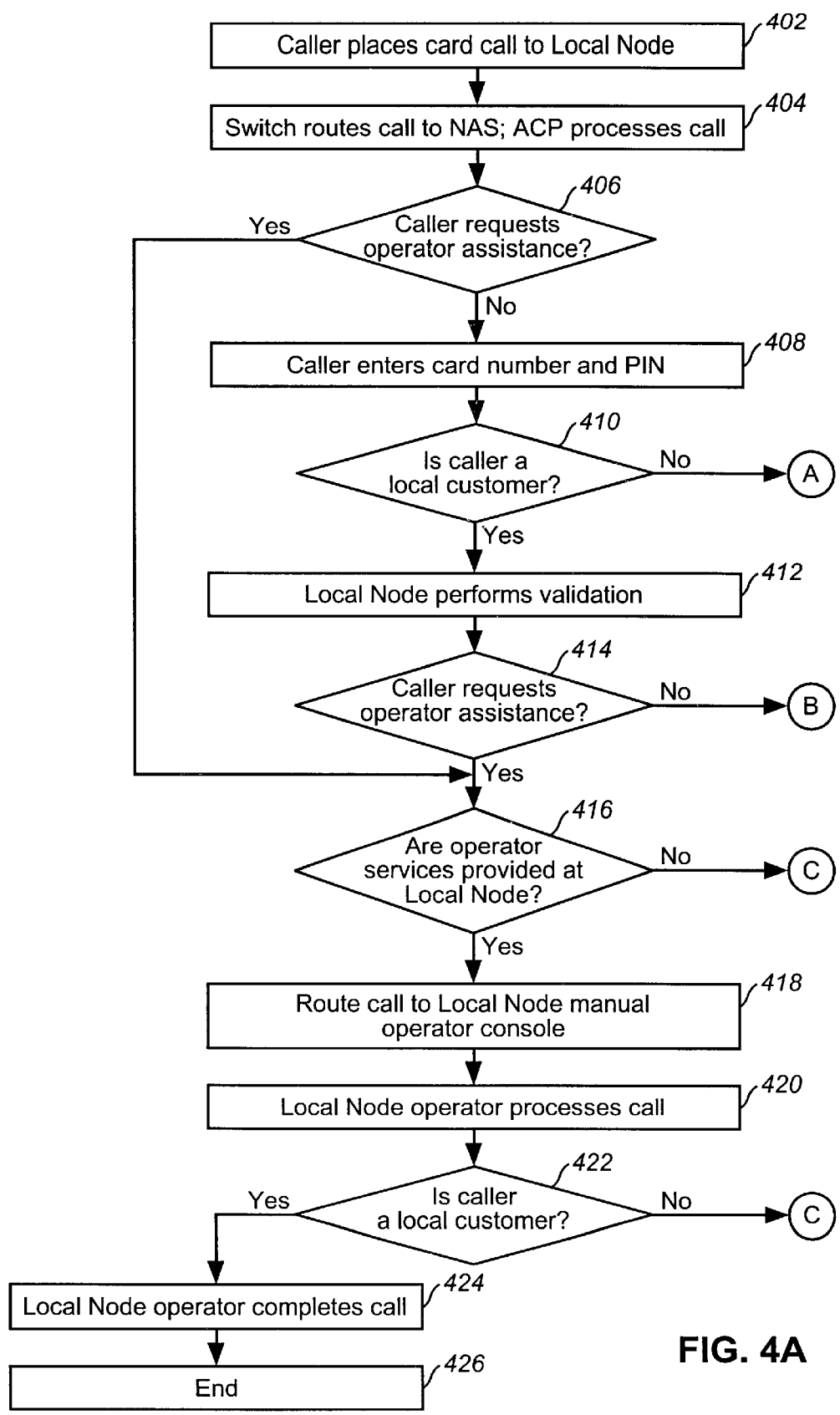
FIGS. 4A and 4B collectively illustrate the operation of a local node when a call is processed.
Figure 4B:
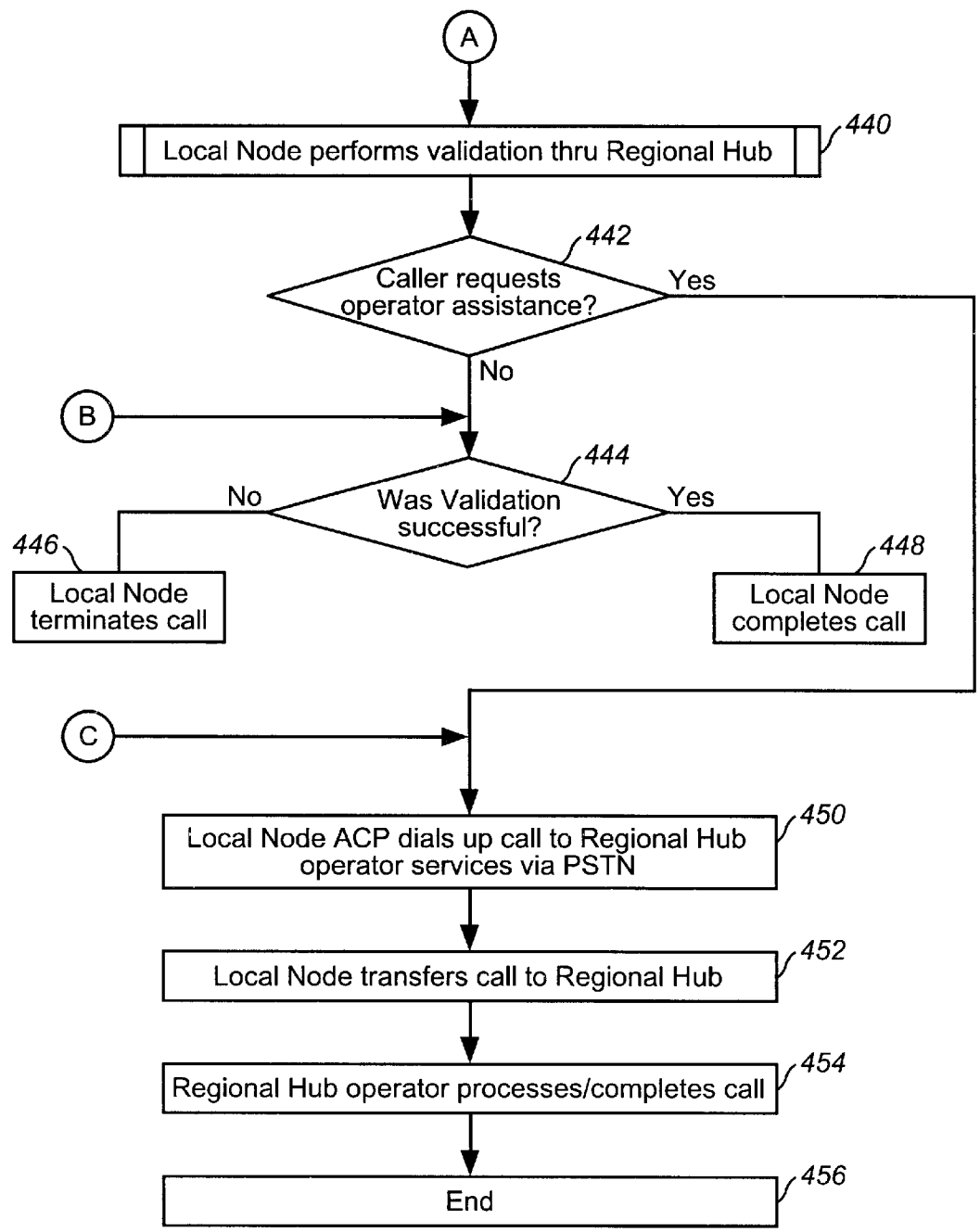

FIGS. 4A and 4B collectively illustrate a flow chart that represents the process performed to complete a card call according to an embodiment of the present invention. It should be understood that this process is applicable to any service. This process includes three key aspects: determining if a caller is a roaming caller or a local caller, validating the caller's identification, and providing live operator services to the caller if requested. Live operator services are provided by manual operator consoles, whereas the ACP provides automated services for all calls.

A caller may request live operator services for a number of reasons. One reason is if the validation of the card number failed for some reason. Operator services provided at the local node follow standard processes. If local node operator services are not provided, or are not provided in a language needed by the caller, the call can then be transferred to the regional hub. This process may be performed for both roaming callers and local customer callers, although it is typically (but not exclusively) a roaming caller's call that requires transferring to the regional hub.

The call handling process of the present invention proceeds as follows, with reference to FIGS. 4A and 4B, and with further reference to FIG. 1.

In step 402, a caller, who can be either a local caller or a roaming caller, places a call to local node 104, 106, or 108 servicing the country or region in which the call originates. Typically, this call is made by dialing a special toll free access number that is common to all callers. The call is routed by the PSTN to a local node, which is a scaleable ISN.

In step 404, programmable switch 130 in the ISN of local node 104, 106, or 108 processes the call according to standard techniques that involve the switch controller, the NAS, and the ACP. As an example, the switch controller causes programmable switch 130 to route the call to the NAS based on the dialed access number, and the NAS, per instructions provided by the ACP, plays an audio message instructing the caller as to his next actions.

At step 406, switch 130 determines whether the caller requests operator assistance. If so, the logic flow skips to step 416, which will be discussed later. At any time during call processing, the caller may request operator assistance. In step 406, for example, a caller may request operator assistance either (1) before entering his card number, (2) if he is not calling from a touch-tone phone, or (3) if he does not know the procedures for placing a card call. A caller can request operator assistance in a number of ways, depending on the platform capabilities. For example, a caller can press the "0" key, can respond to a VRU menu option, can speak "operator" (or the local equivalent) if the VRU has speech recognition capabilities, or via a time-out mechanism.

If the caller does not request operator assistance, the caller is instructed by IVR module 132 to enter his card number and personal identification number (PIN) in step 408.

In step 410, the ACP in the ISN of local node 104, 106, or 108 receives the caller-entered information from the NAS and determines if the caller is a local customer or a roaming caller. In the preferred embodiment shown in this process, this determination is made by the caller's card number. All customers are assigned a special two-digit or three-digit prefix (or suffix) to their card numbers. This prefix designates the country (i.e., home node) to which the caller belongs. In this way, a single dial-in access number may be used for all customers. In one alternate embodiment, the determination of local or roaming caller may be made by having a separate dial-in access number for every home node. This requires multiple different access numbers in each country, each of which must be routed by the local PSTN to the local node in that country. In a second alternate embodiment, the caller is presented with a menu option by the NAS/ACP which solicits the home node/country of the caller. It would be apparent to one skilled in the relevant arts that any procedure that ascertains the home identity of the caller could alternately be used. If the caller is a roaming caller, the logic flow goes to step 440, which will be discussed later.

If the caller is a local caller, local node 104, 106, or 108, through in-country traffic module 118, 122, or 124 performs the validation of the caller in step 412. This validation is accomplished by comparing the card number, the PIN, other restrictions, and any special information regarding the customer, such as a lost card.

At this point in the logic flow, as at any time during the processing of the call, the caller may request operator assistance, as shown by step 414. This might occur because the validation failed. If the caller does request operator assistance, the logic flow moves to step 416, which will be discussed later.

If the caller does not request operator assistance, service logic module 134 determines, at step 444, whether the validation was successful. If it was not successful, the call is terminated in step 446. If the validation was successful, the local node completes the call in step 448 using standard and well known procedures.

If, in step 406 or 414, the caller requests operator assistance, the logic flow moves to step 416. Here, it is determined whether local node 104, 106, or 108 provides manual operator services. If not, the logic flow moves to step 450, which will be discussed later.

If the local node (e.g., local node 104) does provide manual operator services through manual operator and customer service module 138 and it has not yet been determined (in step 410) whether the caller is a local caller or a roaming caller, the call is routed to the local node manual operator console in step 418 which provides operator services. In step 420, the local node operator of local node 104 processes the call.

This processing in step 420 may be different, depending on from which step the call was transferred to the local node manual operator console. If validation successfully occurred in step 412 for a local caller, then the operator is made aware of this when the call is transferred, so that the operator in step 420 need not solicit the caller's card number and PIN again. Otherwise, the operator in 420 solicits the caller's card number and PIN. From this, the operator can determine if the caller is a local caller or a roaming caller in step 422. If the caller is a roaming caller, the call is transferred to regional hub 102 and the logic flow passes to step 450, which will be discussed later. If the caller is a local customer, then in step 424, the local node operator completes the call in whatever way appropriate. The logic flow is completed at step 426.

If, in step 410, the ACP at local node 104, 106, or 108 determines that the caller is a roaming caller, step 440 is performed by roamer/voice module 120. In step 440, local node 104, 106, or 108 performs validation through regional hub 102. It should be noted that, depending on the functional capability of the ACP resident in service logic module 134 of roamer/voice module 120 at local node 104, 106, or 108, the local node can either determine just the fact that the caller is a roaming caller, or it can determine what country (i.e., local/home node) the caller belongs to. Either way, it issues a validation query to regional hub 102. It is through customer data module 112 and support systems module 114 of regional hub 102 that the validation process is accomplished. This logic flow is displayed in detail in FIG. 5, which is described later.

Again, as stated before, the caller can request operator assistance at any time during this process. In step 442, if the roaming caller requests operator assistance, the logic flow moves to step 450, which will be discussed later. If the roaming caller does not request operator assistance at step 442, the logic flow passes to step 444 and is processed as described above.

If, in step 416, the local node (such as local node 106 and 108) does not provide operator services, or, in step 422, the local node operator identifies the caller to be a roaming caller, or, in step 442, the previously identified roaming caller requests operator assistance, the logic flow moves to step 450.

Beginning at step 450, manual operator services are provided to the caller. The ACP from local node 104, 106, or 108 determines in step 416 or step 440 (or the local node operator determines in step 422) that the caller needs to be transferred to the Regional Hub 102 for operator assistance. The local node ACP or operator console determines operator service preference by one of at least four methods (the invention is not limited to these methods):

1. customer profile, if validation was successful in step 440;
2. special access number dialed by the caller to reach local node 104, 106, or 108;
3. special prefix to customer card number; or
4. manual operator input via a VRU menu option, or spoken to the local node operator.

The local node ACP or operator console sends a message to the local node Switch with instructions for transferring the call. Reference here to the Switch includes the combination of the switching platform and the software component (such as a Switch Controller or ACD adjunct processor) that controls the switching platform. The local node Switch then dials up a call to regional hub 102 via the PSTN. Included with this call, via signaling (e.g., SS7), outpulsed digits, or a special dialed access number, is an indication of operator service preference, if any.

In step 452, when the call is connected to regional hub 102, local node 104, 106, or 108 transfers the call over the PSTN to regional hub 102. The Switch in regional hub 102 routes the call to a manual operator service module 116.

In step 454, manual operator service module 116 of regional hub 102 processes and completes the call, and the process ends at step 456.

It should also be noted that if a roaming caller requests operator assistance before entering a card number (i.e., a "yes" response at step 406), the logic flow moves eventually to step 422. If this occurs, the local node operator can directly transfer the call to regional hub 102 at step 452.

If at step 410, service logic module 134 identifies the caller as a roaming caller, the logic flow moves to step 440 for the validation to be performed through regional hub 102. This process is described in detail in FIG. 5, which is described in detail subsequently.

In this example, a customer of a company in one country that owns and/or operates a local node has roamed to a second country where a second company owns and/or operates the local node. Therefore, when the customer makes a call, he will be a roaming caller. This customer's profile may be maintained either (1) at regional hub 102 only, (2) at regional hub 102 and at his home node, or (3) only at his home node. (This depends on business decisions made by the company owning and/or operating the home node when they maintain their platform.) If the customer's profile is maintained at regional hub 102 only or at regional hub 102 and his home node, validation for his calls as a roaming caller are performed at regional hub 102. If his profile is maintained only at his home node, then validation for his calls when he is a roaming caller is performed at his home node, via a validation query issued by regional hub 102 to his home node.

Figure 5:
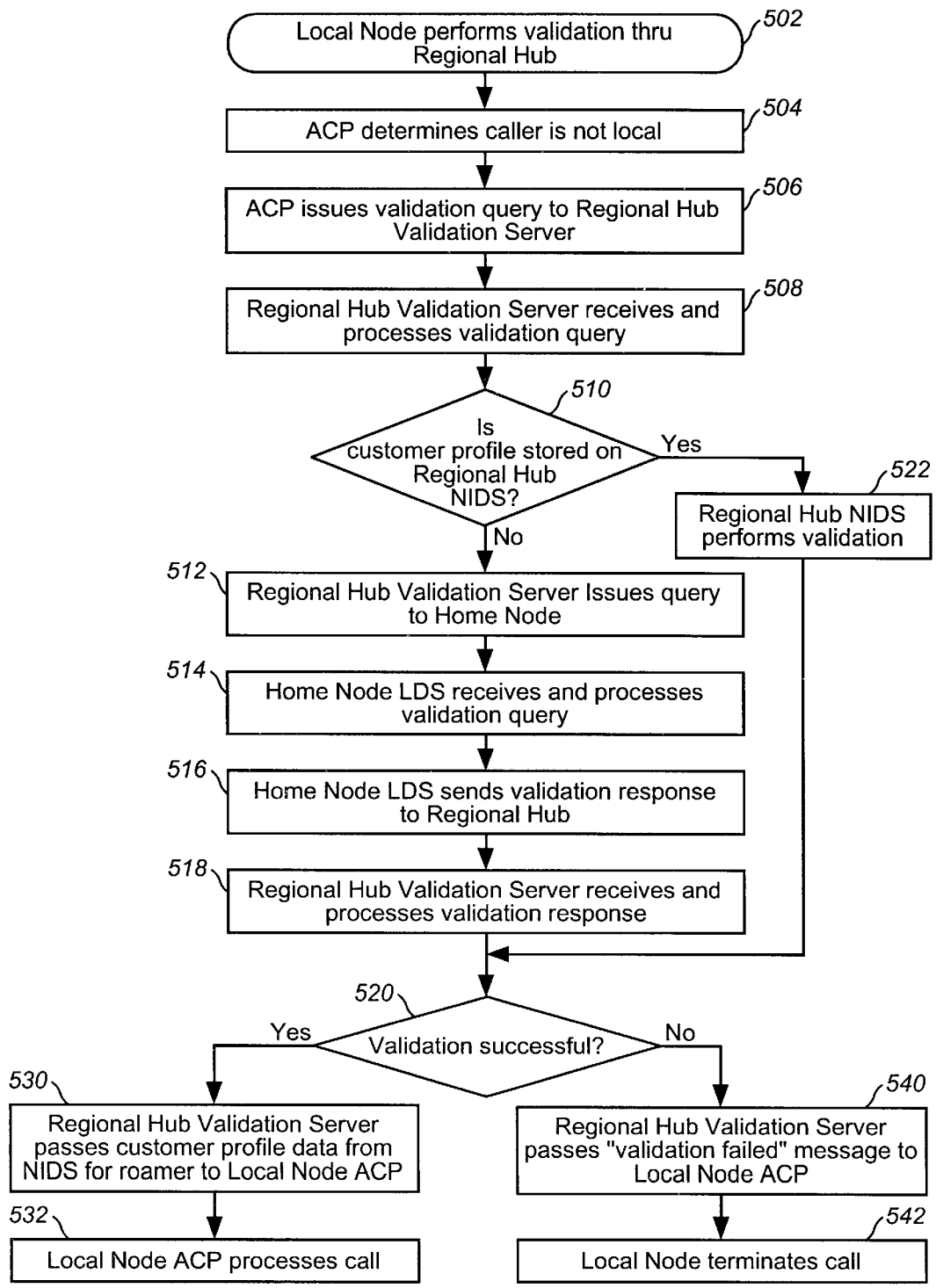
FIG. 5 illustrates the flowchart representing the logic flow when a local node requests a customer validation from a regional hub.

Referring now to FIG. 5, the validation process will now be described. The validation process is initiated in step 502. When, in step 504, the ACP at local node 104, 106, or 108 determines that the caller is a roaming caller, the logic flow moves to step 506, where the ACP issues a validation query to regional hub 102. If the home node of the roaming caller is also determined in step 504, as can be done by reference to the caller's card number, a code designating the caller's home node is included with the validation query, so that regional hub 102 will know where to look for the customer's profile. The validation query is routed to regional hub 102 over WAN 208 or 210 and includes at least the card number and PIN entered by the caller. It may also include other data, such as service or feature requests, home Local Node identifier, access number dialed, automatic number identification (ANI) of call origination, date/time of call origination, etc.

In step 508, the router at regional hub 102 receives the validation query and routes it to the validation server in support systems module 114 which processes the validation query. Processing includes determining where the caller's customer profile is stored. In some cases, the customer's profile will be stored only on the regional hub NIDS. This is the case, for example, for companies who do not wish to incur the expense of maintaining customer profile data and the equipment needed to store such data. In other cases, the customer's profile is stored and maintained at the local node of the company that owns and/or operates the home node to which the customer belongs. The determination is made in step 510. If the customer's profile is not stored at the regional hub NIDS, then the logic flow moves to step 512, which will be discussed later.

If the customer's profile is stored on the regional hub NIDS, then support systems module 114 of regional hub 102 validates the call in step 522. In step 520, the results of the validation are reported back to local node 104, 106, or 108 which requested such validation. If the validation was successful, the logic flow moves to step 530. In step 530, the validation server in regional hub 102 retrieves customer profile data from NIDS and sends it to the ACP at local node 104, 106, or 108 for call processing. The regional hub NIDS sends to the local node ACP whatever data is needed to process the call. This may include service and feature authorizations, speed dialing numbers, language preferences for VRU options, etc. In step 532, the local node processes the call, per instructions provided by the ACP.

If, in step 520, validation for the roaming caller's card number failed, the logic flow moves to step 540. In step 540, the validation server at regional hub 102 sends a "validation failed" message to the ACP at local node 104, 106, or 108. The local node ACP can then take appropriate action, such as solicit the roaming caller for a re-entry of the card number and PIN, or play a message for the roaming caller indicating that the call cannot be completed at this time. The call is terminated in step 542.

In the situation where the roaming caller's customer profile is not stored at the regional hub NIDS (as determined in step 510), then the logic flow moves to step 512. In step 512, the regional hub validation server issues a validation query to the roaming caller's home node. The correct home node for the roaming caller is determined either by the local node where the call originated (and included in its validation query in step 506), or by the regional hub validation server using a table lookup (customer calling card numbers matched to home local node identifiers).

In step 514, the home node of the roaming caller receives and processes the validation query. It validates the roaming caller's card number and PIN against the roaming caller customer profile. It then prepares a response message for regional hub 102. The response message confirms if the call was validated. It also includes data pertaining to the roaming caller's customer profile. This may be done in at least one of two ways. According to a first embodiment, the customer profile is sent to regional hub 102, either as text messages using TCP/IP or as a file using a service like file transfer protocol (FTP). A second embodiment is described as follows:

Generic customer profiles are defined that fit a large majority of customers. Each generic profile is given an identifier ("profile identifier"). Generic profiles are then distributed to the regional hub NIDS (via the data distribution system). The roaming caller's home node LDS determines the profile that the current customer uses, and includes the profile identifier in a response message to regional hub 102. It also includes customer-specific data that serves as field values in a profile; for example, speed dial numbers. Regional hub 102 can simply pull the generic profile that corresponds to the profile identifier provided in the validation response, fill in the customer-specific data also provided in the validation response, and have a complete customer profile for the roaming caller. This preferred method eliminates the need to send entire customer profiles over data links 110. For those customers who use a special profile that is not a generic profile, the entire customer profile can be sent in the validation response. These special cases will be a rare exception.

The second embodiment is preferred.

In step 516, the LDS of the roaming caller's home node sends the validation response to regional hub 102.

In step 518, the regional hub validation server receives and processes the validation response. The logic flow then moves to step 520, where it proceeds as described above.

In an alternate scenario, in steps 512 through 518, the regional hub that first receives the validation request from a local node may have to issue a validation query to a second regional hub rather than to a local node within its region. This would be the situation where the roaming caller belongs to a home node that is not directly connected to the regional hub (i.e., the local node at which the call was placed and the home node of the roaming caller are in different regions, such as America and Europe).

Although the invention has been described and illustrated with a certain degree of particularity, it is understood that one skilled in the relevant arts will recognize a variety of additional applications and appropriate modifications within the spirit of the invention and the scope of the claims.

What is claimed is:

1. A telecommunications network for supporting call service mobility, comprising:

one or more regional hubs, each hub comprising a full scale intelligent service network (ISN), each regional hub coupled to at least one another regional hub; and one or more local nodes, each local node having a scalable version of said full scale ISN and including at least a switch module and an interactive voice response module, each said local node coupled to at least one regional hub, each said regional hub handling at least one of validation and operator service requests for callers of a local node connected thereto, wherein processing of the voice portion of the call occurs at a local node or regional hub where the call is first received.

2. The telecommunications network of claim 1, wherein said scalable ISN further comprises a country-specific customer data module.

3. The telecommunications network of claim 1, wherein said scalable ISN further comprises a manual operator and customer service capability.

4. The telecommunications network of claim 1, wherein said scalable ISN further comprises a service logic module.

5. The telecommunications network of claim 1, wherein said full scale ISN comprises:

a support systems module;

a manual operator service capability; and a customer data module.

6. The telecommunications network of claim 5, wherein said support systems module comprises:

a rate server;

a boot server;

a validation server;

a fraud system server;

an order entry workstation;

a data distribution system; and a billing system.

7. The telecommunications network of claim 5, wherein said manual operator service capability comprises operator service in a plurality of languages.

8. The telecommunications network of claim 5, wherein said customer data module comprises customer profiles for customers from a plurality of countries.

* * * * *